US010445934B1

United States Patent
Worley, III et al.

(10) Patent No.: US 10,445,934 B1
(45) Date of Patent: Oct. 15, 2019

(54) AUGMENTED REALITY ENVIRONMENT WITH ENVIRONMENTAL CONDITION CONTROL

(71) Applicant: Amazon Technologies, Inc., Seattle, WA (US)

(72) Inventors: William Spencer Worley, III, Half Moon Bay, CA (US); Edward Dietz Crump, Santa Cruz, CA (US); William Thomas Weatherford, San Mateo, CA (US); Christopher Coley, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 15/276,507

(22) Filed: Sep. 26, 2016

Related U.S. Application Data

(63) Continuation of application No. 13/220,410, filed on Aug. 29, 2011, now Pat. No. 9,462,262.

(51) Int. Cl.
*G09G 5/00* (2006.01)
*G06T 19/00* (2011.01)
*G06F 3/01* (2006.01)

(52) U.S. Cl.
CPC .......... *G06T 19/006* (2013.01); *G06F 3/011* (2013.01); *G09G 5/003* (2013.01)

(58) Field of Classification Search
None
See application file for complete search history.

(56) References Cited

U.S. PATENT DOCUMENTS

| 5,713,832 A | 2/1998 | Jain |
| 5,950,254 A * | 9/1999 | Yasue ................. A61H 33/063 4/524 |
| 6,111,580 A | 8/2000 | Kazama et al. |
| 6,351,698 B1 * | 2/2002 | Kubota ............... B60R 16/0231 340/988 |
| 6,927,694 B1 | 8/2005 | Smith et al. |
| 7,418,392 B1 | 8/2008 | Mozer et al. |

(Continued)

FOREIGN PATENT DOCUMENTS

WO  WO2011088053 A2  7/2011

OTHER PUBLICATIONS

Hua, et al., "Scape: Supporting Stereoscopic Collaboration in Augmented and Projective Environments", IEEE Computer Society, Jan./Feb. 2004, IEEE, 2004, pp. 66-75.

(Continued)

*Primary Examiner* — Kyle Zhai
(74) *Attorney, Agent, or Firm* — Lee & Hayes, P.C.

(57) ABSTRACT

An architecture includes a system to create an augmented reality environment in which images are projected onto a scene and user movement within the scene is captured. The augmented reality environment is hosted within a surrounding area in which various ambient conditions, external to the augmented reality environment, persist. The architecture monitors the external conditions and controls secondary devices that selectively modify the conditions as desired in cooperation with operation of the augmented reality environment to effectively enhance user experience. Alternatively or additionally, the architecture may inform the user of what changes to make, and the user manually makes the adjustments.

17 Claims, 12 Drawing Sheets

(56) References Cited

U.S. PATENT DOCUMENTS

| | | |
|---|---|---|
| 7,720,683 B1 | 5/2010 | Vermeulen et al. |
| 7,774,204 B2 | 8/2010 | Mozer et al. |
| 8,930,249 B1 | 1/2015 | Gelbaum et al. |
| 2003/0023146 A1 | 1/2003 | Shusterman |
| 2003/0214530 A1 | 11/2003 | Wang et al. |
| 2003/0218321 A1 | 11/2003 | Suzuki et al. |
| 2004/0074935 A1 | 4/2004 | Chon |
| 2006/0263758 A1 | 11/2006 | Crutchfield, Jr. et al. |
| 2007/0083079 A1* | 4/2007 | Lee ................... A61B 5/4806 600/27 |
| 2007/0249952 A1 | 10/2007 | Rubin et al. |
| 2008/0294018 A1 | 11/2008 | Kurtz et al. |
| 2009/0149256 A1 | 6/2009 | Lui |
| 2009/0203308 A1* | 8/2009 | O'Hagin ................ F24F 7/025 454/341 |
| 2009/0253554 A1 | 10/2009 | McIntosh |
| 2009/0292528 A1* | 11/2009 | Kameyama .......... G08G 1/0962 704/9 |
| 2010/0070089 A1* | 3/2010 | Harrod ................ G05B 19/042 700/277 |
| 2010/0289643 A1* | 11/2010 | Trundle ................ G08C 19/16 340/545.1 |
| 2010/0295771 A1 | 11/2010 | Burton et al. |
| 2010/0312547 A1* | 12/2010 | Van Os .................. G10L 15/26 704/9 |
| 2011/0125063 A1 | 5/2011 | Shalon et al. |
| 2011/0160524 A1 | 6/2011 | Ni et al. |
| 2011/0272131 A1* | 11/2011 | Mikat ................ B60H 1/00742 165/202 |
| 2011/0283190 A1 | 11/2011 | Poltorak |
| 2011/0307309 A1 | 12/2011 | Forster et al. |
| 2012/0005624 A1 | 1/2012 | Vesely |
| 2012/0017147 A1* | 1/2012 | Mark .................... G06F 1/1639 715/702 |
| 2012/0130679 A1* | 5/2012 | Fadell ................ F24F 11/0012 702/183 |
| 2012/0157206 A1 | 6/2012 | Crevin et al. |
| 2012/0223885 A1 | 9/2012 | Perez |
| 2012/0327172 A1 | 12/2012 | El-Saban et al. |

OTHER PUBLICATIONS

Final Office Action for U.S. Appl. No. 13/220,410, dated Feb. 12, 2015, William Spencer Worley III, "Augmented Reality Environment With Environmental Condition Control", 45 pages.

Office action for U.S. Appl. No. 13/220,410, dated Feb. 18, 2016, Worley III et al., "Augmented Reality Environment With Environmental Condition Control", 16 pages.

Office Action for U.S. Appl. No. 13/220,410, dated May 22, 2014, William Spencer Worley III, "Augmented Reality Environment With Environmental Condition Control", 38 pages.

Office action for U.S. Appl. No. 13/220,410, dated Aug. 13, 2015, Worley III et al., "Augmented Reality Environment With Environmental Condition Control", 50 pages.

Pinhanez, "The Everywhere Displays Projector: A Device to Create Ubiquitous Graphical Interfaces", IBM Thomas Watson Research Center, Ubicomp 2001, 18 pages.

Wilson, et al., "Combining Multiple Depth Cameras and Projectors for Interactions on, Above, and Between Surfaces", UIST'10, Oct. 3-6, 2010, New York, NY, ACM, 2010, 10 pages.

* cited by examiner

AUGMENTED REALITY ENVIRONMENT WITH ENVIRONMENTAL CONDITION CONTROL

CROSS REFERENCE TO RELATED APPLICATIONS

This application is a continuation of and claims priority from U.S. patent application Ser. No. 13/220,410 titled "Augmented Reality Environment With Environmental Condition Control," filed on Aug. 29, 2011, which is herein incorporated by reference in its entirety.

BACKGROUND

Augmented reality allows interaction among users, real-world objects, and virtual or computer-generated objects and information within an augmented reality environment. Within the augmented reality environment, images may be presented on various objects and users may interact with the images and/or objects in a number of ways. However, augmented reality environments are hosted within areas, such as rooms, which have various conditions that may impact user experience. These conditions are external to the augmented reality environment, but may still influence the user experience. For instance, ambient temperature or lighting conditions within a room that hosts the augmented reality environment may adversely affect the user's comfort or ability to see and interact with the projected images. What is desired is some measure of control over these external conditions to ensure positive user experience within the augmented reality environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, displays, and so forth. The projectors project images onto the surroundings that define the environment and the cameras monitor user interactions with such images.

An augmented reality environment is commonly hosted or otherwise set within a surrounding area, such as a room, building, or other type of space. This environmental area that encompasses the augmented reality environment may be characterized by various conditions, such as temperature, humidity, lighting, odor, noise, etc. These conditions may impact user experience while participating in the augmented reality environment.

Described herein is an architecture to create an augmented reality environment within a surrounding environmental area in which such external conditions in the environmental area are controlled to enhance user experience. The architecture monitors the external conditions and controls secondary devices that selectively modify the conditions as desired in cooperation with operation of the augmented reality environment. Alternatively or additionally, the architecture may inform the user of what changes to make, and the user manually makes the adjustments. In each of the instances where the architecture modifies the conditions or suggests modification of the conditions, a user within the environment may override these modifications or suggestions made by the architecture.

The architecture may be implemented in many ways. One illustrative implementation is described below in which an augmented reality environment is created within a room having various conditions, such as lighting, temperature, humidity, fragrance, airflow, and noise. However, the architecture may be implemented in many other situations.

Illustrative Environment

Figure 1:
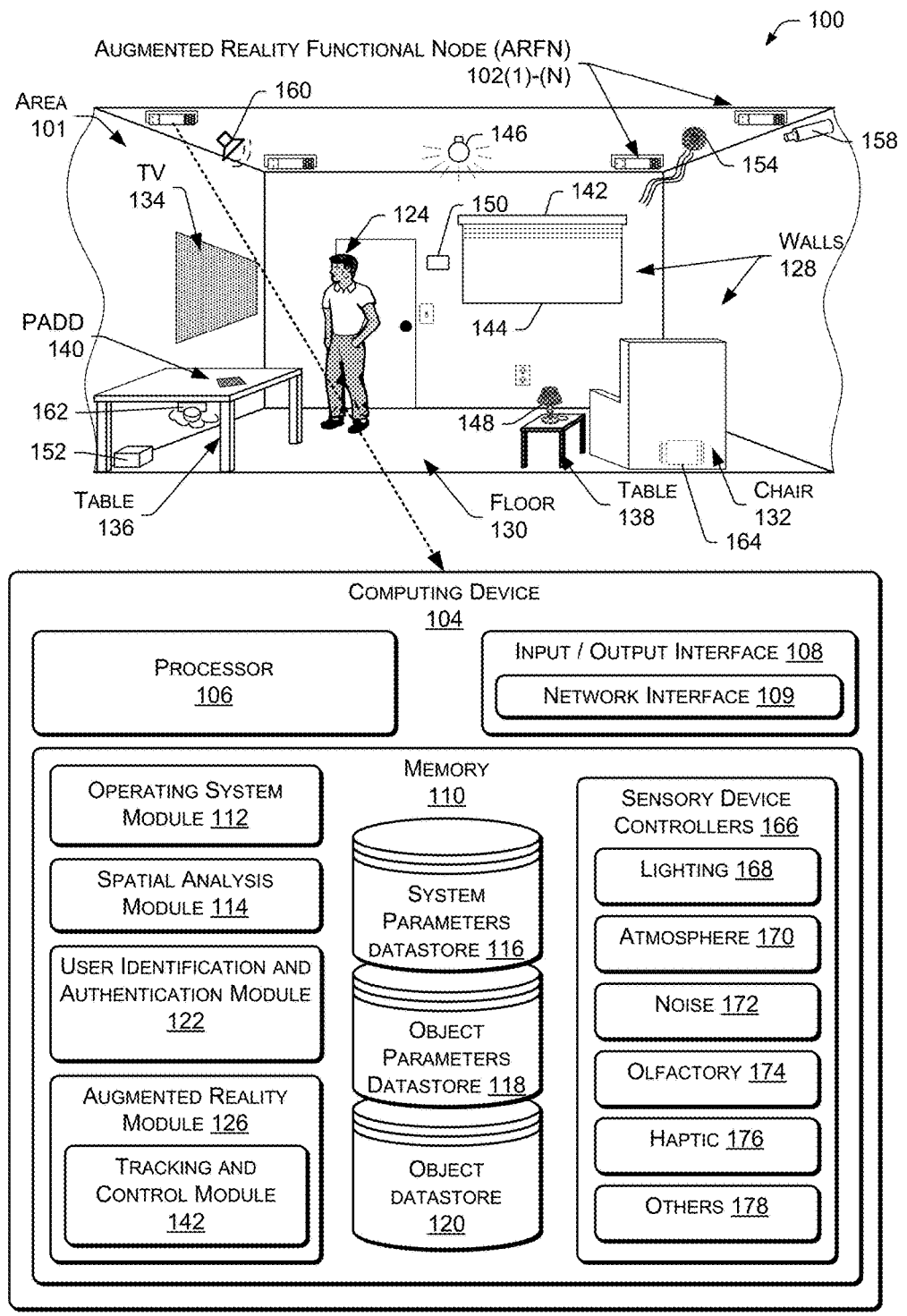
FIG. 1 shows an illustrative scene with an augmented reality environment hosted in an environmental area, such as a room. The augmented reality environment is provided, in part, by an augmented reality functional node (ARFN) located in the scene. Secondary devices are also shown in the room to control conditions in the area.

FIG. 1 shows an illustrative augmented reality environment 100 created within a scene, and hosted within an environmental area 101, which in this case is a room. Multiple augmented reality functional nodes (ARFN) 102(1)-(N) contain projectors, cameras, and computing resources that are used to generate the augmented reality environment 100. In this illustration, four ARFNs 102(1)-(4) are positioned around the scene. In other implementations, a single ARFN 102 may be used and positioned in any number of arrangements, such as on the ceiling, in a lamp, on the wall, beneath a table, and so forth. One implementation of the ARFN 102 is provided below in more detail with reference to FIG. 2.

Each ARFN 102(1)-(4), or a collection of ARFNs, includes a computing device 104, which may be located within a housing of the augmented reality environment 100 or disposed at another location external to it, or even external to the area 101. Other components of each ARFN 102 may connect to the computing device 104 via a wired network, a wireless network, or a combination of the two. The computing device 104 has a processor 106, an input/output interface 108, and a memory 110. The processor 106 may include one or more processors configured to execute instructions. The instructions may be stored in memory 110, or in other memory accessible to the processor 106, such as storage in cloud-base resources.

The input/output interface 108 may be configured to couple the computing device 104 to other components, such as projectors, cameras, microphones, displays, other ARFNs 102, other computing devices, and so forth. The input/output interface 108 may further include a network interface 109 that facilitates connection to a remote computing system, such as cloud computing resources. The network interface 109 enables access to one or more network types, including wired and wireless networks. More generally, the coupling between the computing device 104 and any components may be via wired technologies (e.g., wires, fiber optic cable, etc.), wireless technologies (e.g., RF, cellular, satellite, Bluetooth, etc.), or other connection technologies.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 110 and configured to execute on a processor, such as the processor 106. An operating system module 112 is configured to manage hardware and services within and coupled to the computing device 104 for the benefit of other modules.

A spatial analysis module 114 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 114 provides the information used within the augmented reality environment to provide an interface between the physicality of the scene and virtual objects and information.

A system parameters datastore 116 is configured to maintain information about the state of the computing device 104, the input/output devices of the ARFN 102, and so forth. For example, system parameters may include current pan and tilt settings of the cameras and projectors. As used in this disclosure, the datastore includes lists, arrays, databases, and other data structures used to provide storage and retrieval of data.

An object parameters datastore 118 in the memory 110 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 118.

An object datastore 120 is configured to maintain a library of pre-loaded reference objects. This information may include assumptions about the object, dimensions, and so forth. For example, the object datastore 120 may include a reference object of a beverage can and include the assumptions that beverage cans are either held by a user or sit on a surface, and are not present on walls or ceilings. The spatial analysis module 114 may use this data maintained in the datastore 120 to test dimensional assumptions when determining the dimensions of objects within the scene. In some implementations, the object parameters in the object parameters datastore 118 may be incorporated into the object datastore 120. For example, objects in the scene which are temporally persistent, such as walls, a particular table, particular users, and so forth may be stored within the object datastore 120. The object datastore 120 may be stored on one or more of the memory of the ARFN 102, storage devices accessible on the local network, or cloud storage accessible via a wide area network.

A user identification and authentication module 122 is stored in memory 110 and executed on the processor(s) 106 to use one or more techniques to verify users within the environment 100. In this example, a user 124 is shown within the room. In one implementation, the ARFN 102 may capture an image of the user's face and the spatial analysis module 114 reconstructs 3D representations of the user's face. Rather than 3D representations, 2D representations or other biometric profiles may be computed, such as a face profile that includes key biometric parameters such as distance between eyes, location of nose relative to eyes, etc. In such profiles, less data is used than fully reconstructed 3D images. The user identification and authentication module 122 can then match the reconstructed images (or other biometric parameters) against a database of images (or parameters), which may be stored locally or remotely on a storage system or in the cloud, for purposes of authenticating the user. If a match is detected, the user is permitted to interact with the system.

In another implementation, the user identification and authentication module 122 may utilize a secondary test that involves interaction between the user and the ARFN 102 as part of the authentication process. For instance, after analyzing a 3D reconstructed image or other biometric parameters, the user may be presented with shapes projected onto a wall or table surface. The user may be asked to pick out a pre-determined shape known to the user. Such selection may be based on hand motion or physically pointing to the shape. As another example, the secondary indicia may be a sound sequence made by the user, such as two claps followed by a finger snap. These additional indicia may be used as a further test to confirm a user identify.

In another implementation, the room may be equipped with other mechanisms used to capture one or more biometric parameters pertaining to the user, and feed this information to the user identification and authentication module 122. For instance, a scanner may be mounted on the wall or embedded in the ARFN to scan the users fingerprint, or hand profile, or retina. In other implementations, the user may use verbal input and the module 122 verifies the user through an audio profile match. In still other implementations, the use may enter a pass code via a keypad or other input method within the environment 100.

An augmented reality module 126 is configured to generate augmented reality output in concert with the physical environment. The augmented reality module 126 may employ essentially any surface, object, or device within the environment 100 to interact with the user 124. In this example, the room has walls 128, a floor 130, a chair 132, a TV 134, tables 136 and 138, and a projection accessory display device 140. The accessory display device 140 may be essentially any device for use within an augmented reality environment, and may be provided in several form factors, including a coaster, placemat, tablecloth, countertop, tabletop, and so forth. A projection surface on the accessory display device 140 facilitates presentation of an image generated by an image projector, such as the projector that is part of an augmented reality functional node (ARFN) 102. The accessory display device 140 may range from entirely non-active, non-electronic, mechanical surfaces to full functioning, full processing and electronic devices. Example accessory display device 140 are described in more detail with reference to U.S. patent application Ser. No. 12/977,949, which is entitled "Powered Augmented Reality Projection Accessory Display Device," and was filed on Dec. 23, 2010, and to U.S. patent application Ser. No. 12/977,992, which is entitled "Unpowered Augmented Reality Projection Accessory Display Device," and was filed on Dec. 23, 2010. These applications are hereby incorporated by reference.

Within the illustrated room, any object may form a part of the augmented reality environment (ARE) by, for instance, acting as a display surface upon which images may be projected. Examples of such things may be the walls 128, floor 130, and tables 136, 138, and accessory display device 140. Some objects, meanwhile, may additionally or alternatively be controlled, directly or indirectly, by the system of ARFNs 102(1)-(N). For instance, the ARFNs 102(1)-(N) may utilize a television, speakers, or other output devices within the room for the purpose of outputting content.

Accordingly, the augmented reality module 126 may be used to track not only items within the environment that were previously identified by the spatial analysis module 114, and stored in the various datastores 116-120, but also any other additional items that have been moved into the environment. The augmented reality module 126 includes a tracking and control module 142 configured to track one or more items within the scene and accept inputs from or relating to the items.

The ARFNs 102, as described, may be operated to create an augmented reality environment in which images are projected onto various surfaces and items in the room, and the user 124 (and/or other users not pictured) may interact with the images. The users' movements, voice commands, and other interactions are captured by the ARFNs 102 to facilitate user input to the environment.

As noted above, the augmented reality environment 100 is hosted within an environmental area 101, such as the room. The environmental area 101 may be described by a set of conditions—such as ambient temperature, ambient lighting, noise, and so forth—that are external to the augmented reality environment 100 being created by the ARFNs 102. In some situations, these conditions may adversely affect user experience. However, if these conditions could be controllably adjusted as needed, the area 101 could be selectively modified to enhance user experience while the user engages the augmented reality environment.

Accordingly, the ARFNS 102 are equipped to monitor these ambient conditions within the area 101 in an effort to control them. Many of the conditions can be controlled by secondary devices, which are external to the ARFNs that create the augmented reality environment. In the illustrated example, the room is equipped with several illustrative devices that may be used to control ambient conditions. For instance, an automated window blind 142 is provided to selectively cover or uncover a window 144 to adjust ambient lighting within the area 101. Additionally, a ceiling light 146 and a table lamp 148 may also be controllably adjusted to change ambient lighting. Other lighting apparatuses may be employed, such as a window comprising a single pixel LED element that may be selectively adjusted to alter the amount of light allowed through the window. Further, the TV 134 (or other light emitting displays) may be controlled to alter brightness, contrast, and otherwise impact viewing conditions.

An ambient temperature regulator 150 may be provided to control the room temperature. A humidity regulator 152 may be employed to control humidity within the room. An air movement mechanism 154 may be used to adjust air flow within the room. An oxygen generation or pneumatic device 158 may be used to add fresh air and/or more oxygen to the room when desired. Other devices for controlling atmospheric-related conditions may also be used.

In other implementations, a noise cancellation system 160 may be provided to reduce ambient noise that is generated by sources external to the augmented reality environment. The noise cancellation system detects sound waves and generates other waves that effectively cancel the sound waves, thereby reducing the volume level of noise.

An olfactory device 162 may be provided to modify the odor in the room. For instance, the olfactory device 162 may controllably release fragrance into the room.

In yet another implementation, one or more haptic devices may be provided to provide tactile feedback to the user. For example, a vibration mechanism 164 may be positioned in furniture, such as chair 132, to provide tactile feedback to the user. In one example below, the vibration mechanism may be used to relax the user during an augmented reality experience or used to awaken the user in an effort to keep him or her from falling asleep. However, other haptic devices may be used to provide tactile feedback, such as air engines that generate puffs of air, heat generators that produce zones of differing temperature in a space, acoustic wave generators to create non-audible acoustical waves, and so forth.

The computing device 104 has one or more controllers 166 to coordinate operation of the secondary devices to control ambient conditions within the environmental area 101. Illustrative controllers include lighting controller(s) 168 for the window blind 142, ceiling light 146, table lamp 148, and any other light affecting device. An atmosphere controller 170 is provided to control the device affecting atmosphere conditions, such as the temperature controller 150, humidity regulator 152, and pneumatic device 158. A noise controller 172 is included to control the noise cancellation system 160. An olfactory controller 174 is provided to control the olfactory device 162 to modify smells within the room. A haptic controller 176 is provided to control the various haptic devices in the room, such as the vibration mechanism 164 in the chair 132. Other controllers 178 may also be provided to control devices used to modify any number of conditions within the environmental area 101.

These devices may be coupled to receive instructions directly from the computing device 104 via wired or wireless technologies. In some implementations, the ARFNs 102 are equipped to sense the various conditions in the area 101. The ARFNs 102 can determine whether to adjust the conditions based upon whether the user's interaction with the augmented reality environment will be enhanced. In other implementations, independent sensors (perhaps associated with the devices) detect the ambient conditions and provide that information to the ARFNs 102 for a determination as to whether such conditions should be adjusted given the current augmented reality environment. In yet other implementations, the ARFNs 102 may receive commands from the user in the form of voice commands, or hand/body gestures, that request the ARFNs to control some aspect of the conditions within the environmental area 101.

Assuming an adjustment is desired, the ARFN 102 may send instructions to the appropriate device to automatically make the adjustment. For instance, if the ARFN 102 decides the room temperature is too high, the ARFN 102 may direct the temperature regulator 150 to lower the temperature. If there is deemed too much light, the ARFN 102 may direct the light 146 and/or lamp 148 to dim. Additionally or alternatively, the ARFN 102 may direct the window blind 142 to partially close.

Also, in other implementations, the ARFN 102 may present instructions that ask the user to make these adjustments manually, by turning down the heat or closing the window blind. For instance, the ARFN 102 may display instructions on the TV 134 or accessory display device 140 for the user to follow. Alternatively, the ARFN may project an image near the specific device, where the image illustrates the action to be taken. In still another alternative, the ARFN 102 may use audible commands to tell the user what action to take.

Figure 2:
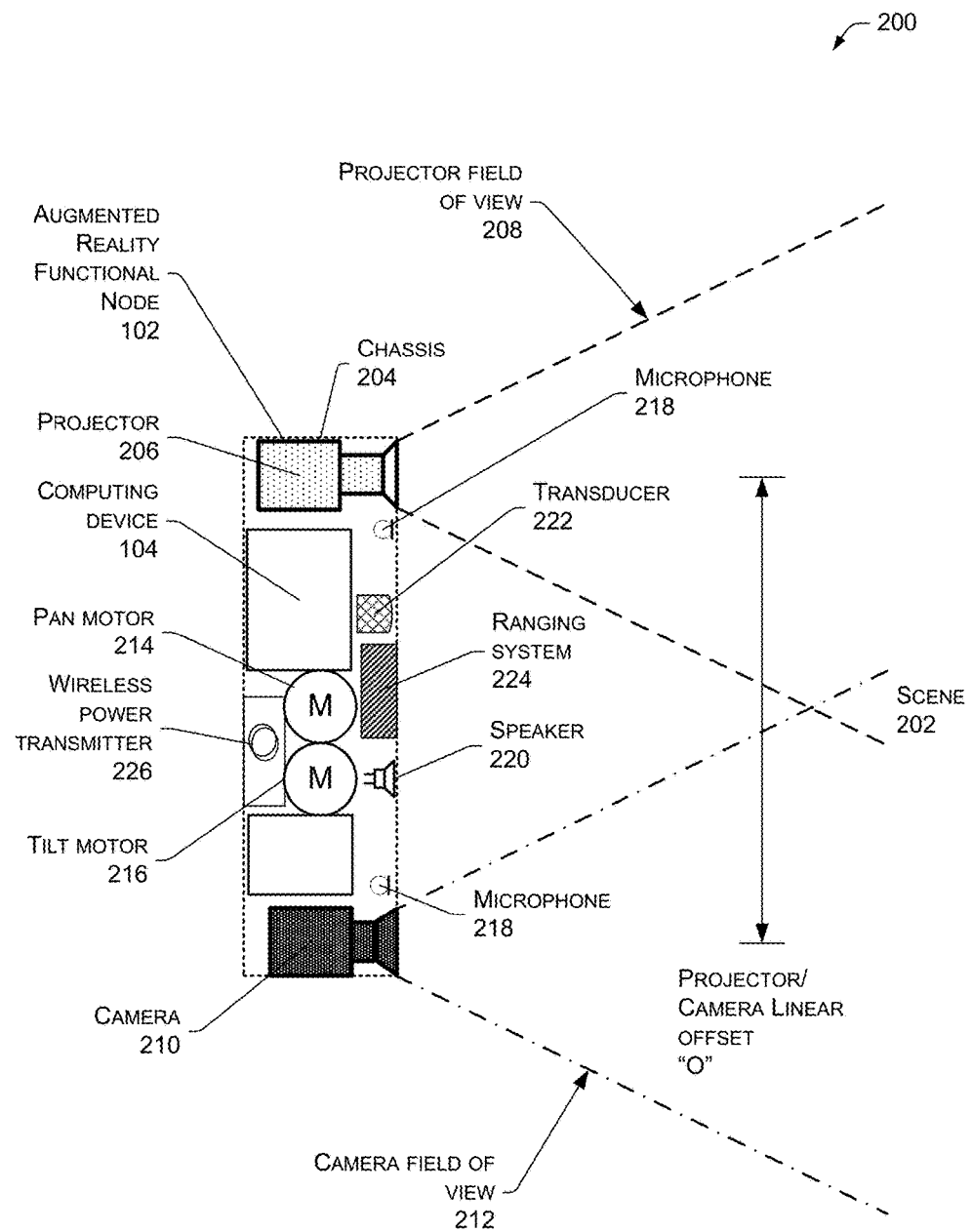
FIG. 2 shows an illustrative augmented reality functional node that includes or is associated with a computing device, along with other selected components.

FIG. 2 shows an illustrative schematic 200 of the augmented reality functional node 102 and selected components. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102, or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102.

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components within the accessory display device 140. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 104 is shown within the chassis 204. However, in other implementations all or a portion of the computing device 104 may be disposed in another location and coupled to the other components of the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, microphones 218 and speakers 220 may be distributed throughout the scene. The projector 206 and the camera 210 may also be located in separate chassis 204.

Figure 3:
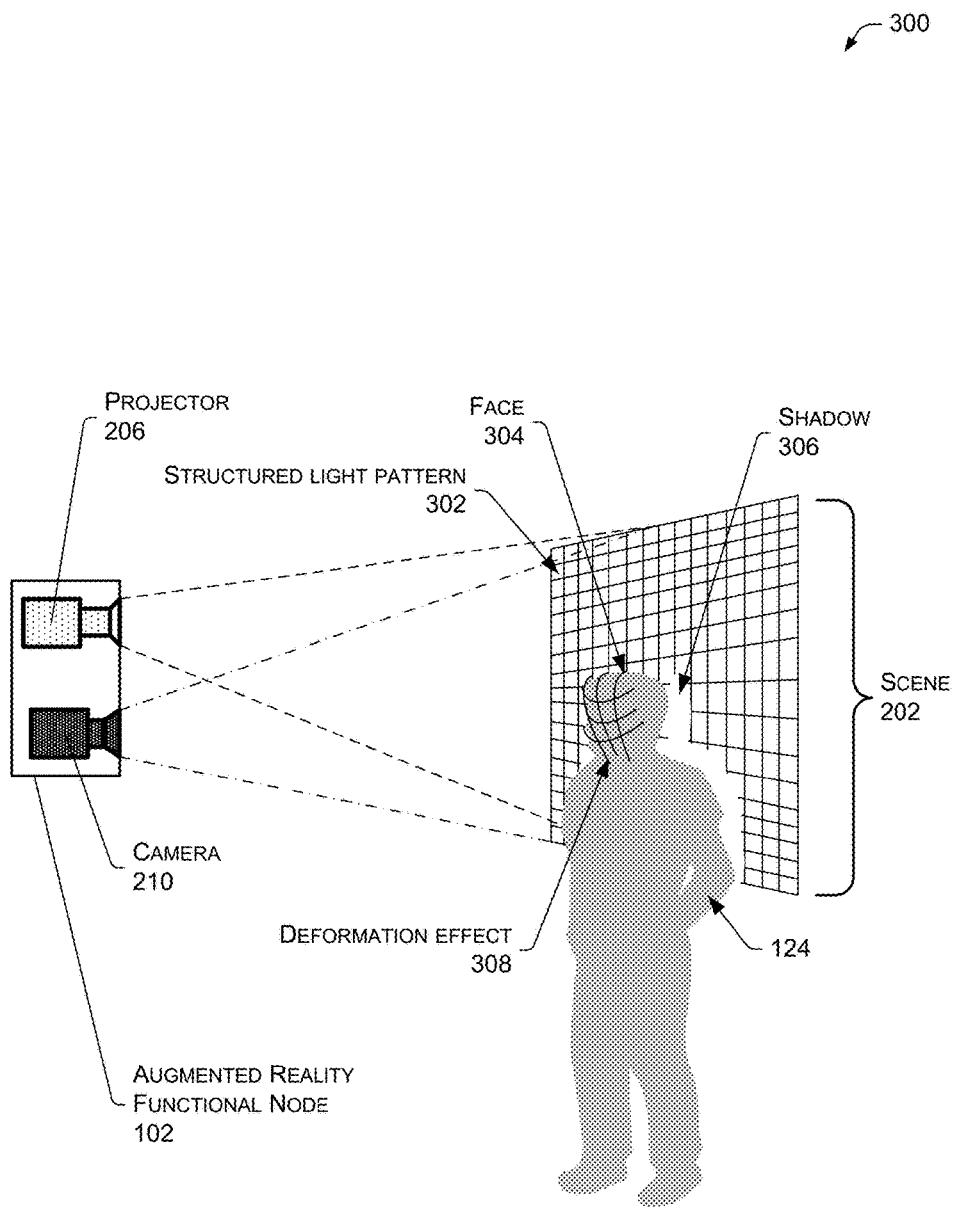
FIG. 3 illustrates the augmented reality functional node projecting a structured light pattern on a scene and capturing a corresponding image of the scene. The node may be configured to perform user identification and authentication.

FIG. 3 illustrates a structured light pattern 300 impinging on the scene 202. In this illustration, the projector 206 within the ARFN 102 projects a structured light pattern 302 onto the scene 202. In some implementations, a sequence of different structured light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom Noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 124 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 114 to characterize the scene 202. In some implementations, multiple cameras may be used to acquire the image. In other instances, the images of the user's face 304 (or other body contours, such as hand shape) may be processed by the spatial analysis module 114 to reconstruct 3D images of the user, which are then passed to the user identification and authentication module 122 for purposes of verifying the user.

Certain features of objects within the scene 202 may not be readily determined based upon the geometry of the ARFN 102, shape of the objects, distance between the ARFN 102 and the objects, and so forth. As a result, the spatial analysis module 114 may be configured to make one or more assumptions about the scene, and test those assumptions to constrain the dimensions of the scene 202 and maintain the model of the scene.

Illustrative Secondary Devices

The following describes several illustrative secondary devices that may be used to modify conditions within the environmental area 101, within which the augmented reality environment 100 is set. These secondary devices are merely illustrative, and many other types may be employed to control conditions within the area.

Figure 4:
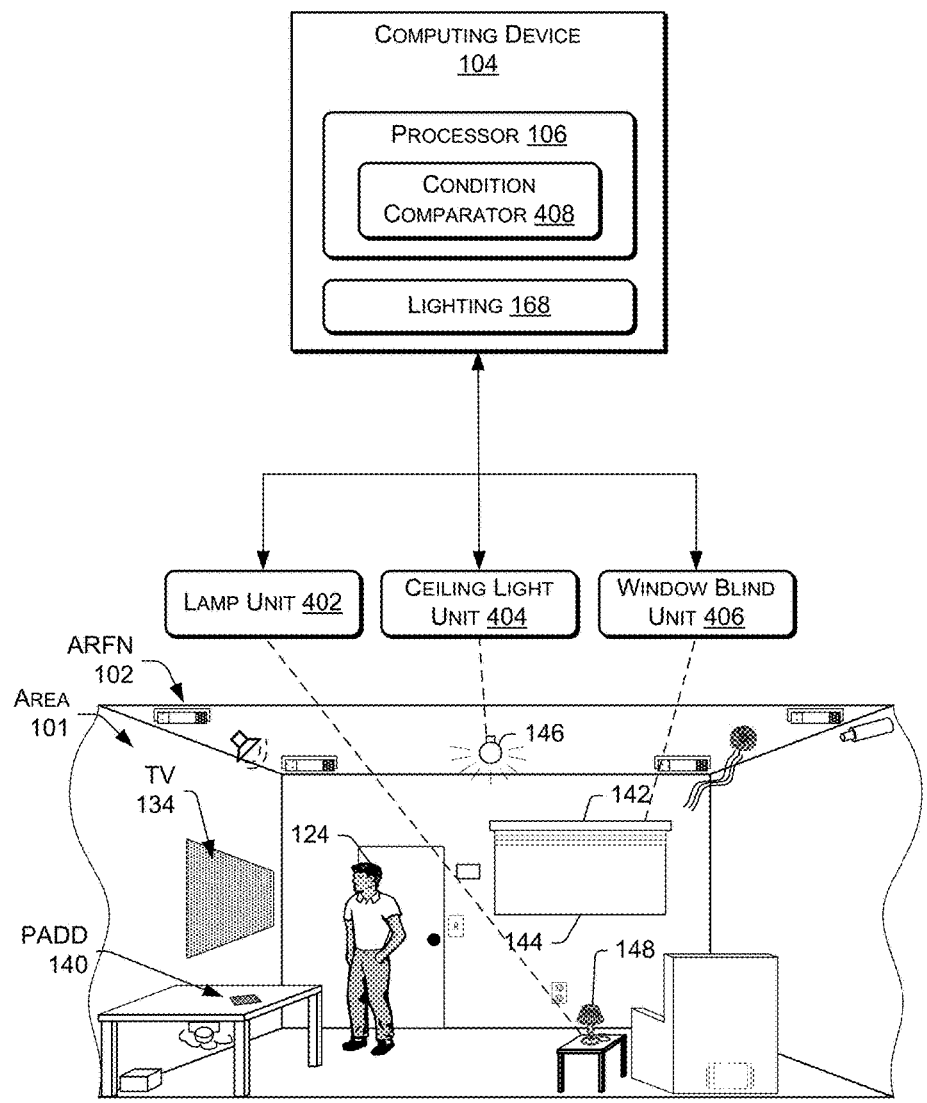
FIG. 4 shows illustrative examples of secondary devices in the form of devices used to control ambient lighting conditions, such as an automated window blind.

FIG. 4 shows a first set of illustrative secondary devices in the form of devices used to control ambient lighting conditions within the area 101. In this illustration, at least three devices are depicted that may be used to alter or otherwise control the amount of light within environment 100: ceiling light 146, table lamp 148, and window blind 142. Each of these units is equipped or associated with a controlling unit that is configured to receive instructions from the lighting device controller 168 executing at the computing device 104. A lamp unit 402 is configured to receive instructions from the lighting device controller 168 and in response, adjust an amount of light emitted by the table lamp 148. Similarly, a ceiling light unit 404 is configured to receive instructions from the lighting device controller 168 and in response, alter the light emission from the ceiling light 146. A window blind unit 406 receives instructions from the lighting device controller 168 and in response, raises, lowers or otherwise adjusts the location of the window blind 142 over the window 144.

In one implementation, an ARFN 102 may be equipped with sensors to detect various ambient conditions in the area 101. In other implementations, the secondary devices themselves may be equipped with sensors to monitor the ambient conditions, such as lighting within the area 101. In still other implementations, independent sensors may be provided within the area 101 to detect current conditions.

The conditions are supplied to the ARFN 102, or more particularly, to the computing device 104, where they are stored. The computing device 104 then determines whether the current conditions are suitable for the ongoing augmented reality environment. In FIG. 4, a condition comparator 408 is shown executing on the processor 106 to compare the current conditions with preferred conditions (also stored in memory) that are associated with the augmented reality environment. If the conditions are determined to be out of band from the preferred conditions, the computing device 104 will direct the lighting-affecting devices—window blind 142, ceiling light 146, lamp 148—via the lighting driver 168 to modifying the ambient light within the area 101. Alternatively, the computing device 104 may direct instructions to be presented on the TV 134 or perhaps project instructions or images on to surfaces near the controllers to instruct the user 124 to manually adjust the devices.

Figure 5:
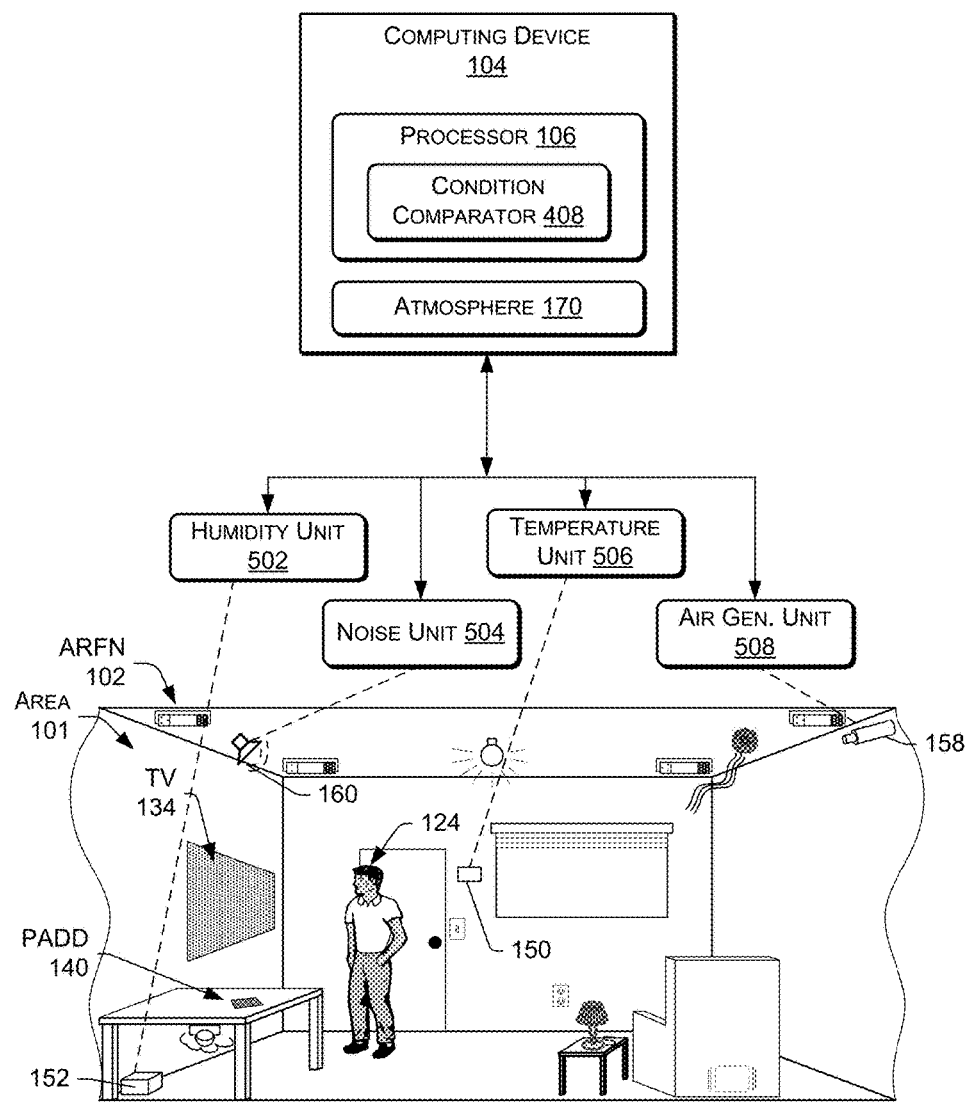
FIG. 5 shows more examples of secondary devices, these in the form of atmosphere controllers for controlling such conditions as temperature, humidity, noise, and so forth.

FIG. 5 shows more illustrative secondary devices, with these being in the form of devices that control conditions such as temperature, humidity, noise, air content, and so forth within the area 101. In this illustration, four such devices are depicted, including a humidity regulator 152, a noise cancellation system 160, an ambient temperature regulator 150, and a pneumatic device 158. Each of these units is equipped or associated with a controlling unit that is configured to receive instructions from the atmosphere device controller 170 executing at the computing device 104. A humidity unit 502 is configured to receive instructions from the controller 170 and in response, cause the humidity regulator 152 to adjust the humidity in the room. Similarly, a noise unit 504 receives instructions pertaining to ambient noise, and causes the noise cancellation system 160 to create cancelling waveforms. A temperature unit 506 interfaces with the atmosphere controller 170 and causes the temperature regulator 150 to changing the room temperature. An air generation unit 508 receives instructions from the atmosphere driver 170 to cause the pneumatic device 158 to introduce more air and/or oxygen to the room.

The units 502-508 may reside with the associated devices, or separate from them. The units are configured to communicate via wired or wireless technology with the computing device 104.

Figure 6:
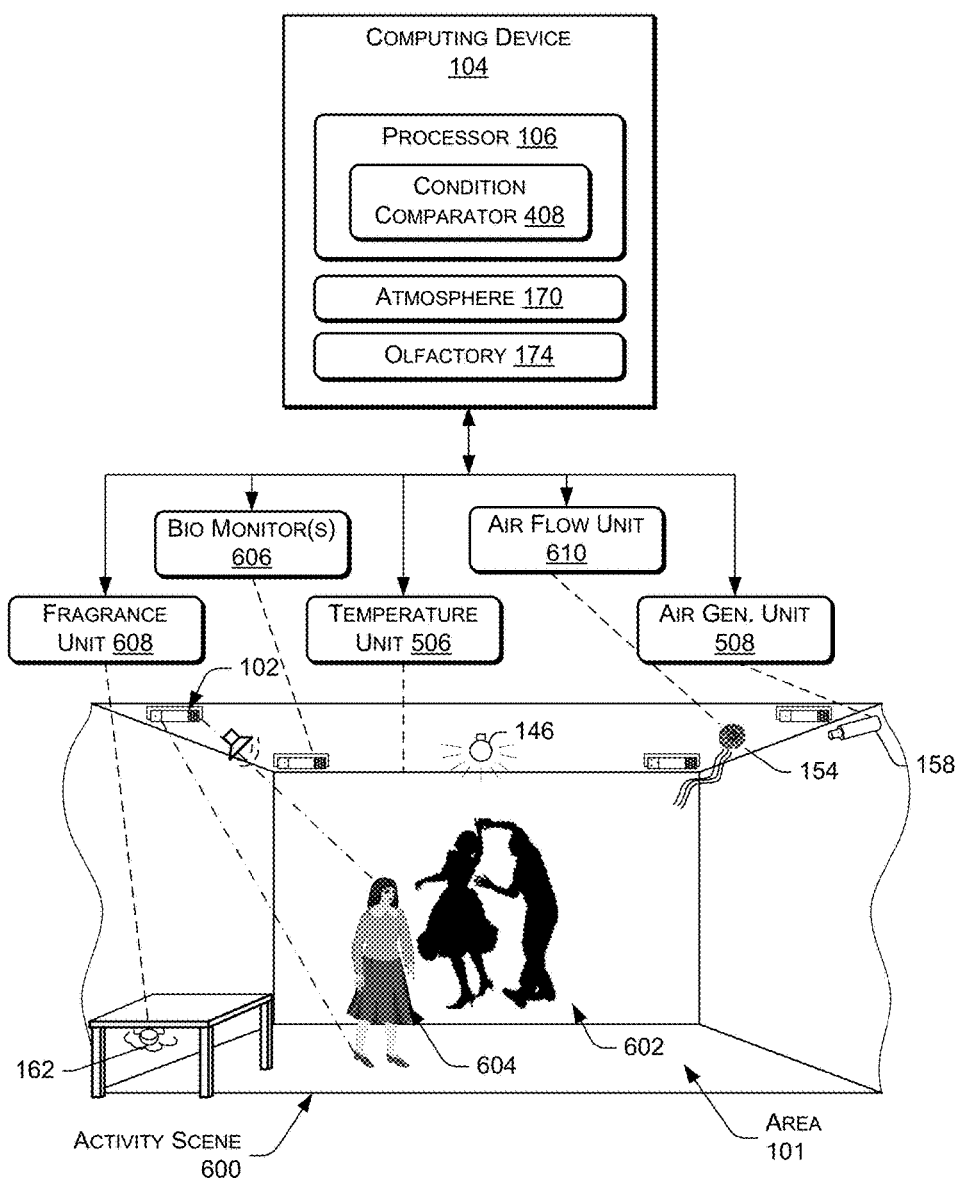
FIG. 6 shows an illustrative scene with an augmented reality environment in which a user undertakes some form of physical activity within the environmental area. The ARFN monitors the user's biometric conditions and directs the secondary devices to modify conditions within the environmental area.

FIG. 6 shows an illustrative scene 600 with an augmented reality environment in which a user undertakes some form of physical activity within the environmental area 101. In this illustration, the projector of the ARFN 102 projects an image 602 onto a wall to lead a user 604 through the activity, which in this case is country dancing. In some instances, another projector (forming a portion of the illustrated ARFN 102 or another ARFN) may project structured light, the image 602, or both. In some implementations the image 602 may be presented on a display device such as a television or computer monitor in the environment. As the user 604 dances along in the scene, the camera of the ARFN 102 detects the movement as deformation of this structured light.

While the user is engaging in this activity, a set of biometric monitors 606 are provided to track biometric conditions of the user. The biometric monitors 606 may sense any number of physical conditions, such as pulse, body temperature, breathing patterns, skin coloration, and so forth. Each of these biometric conditions may be indicative of the user's exercise state and may be used to determine the current health status of the user. The measurements are transferred to the computing device 104, where they are analyzed and compared to the user's normal data. In some cases, the computing device 104 may determine that one or more conditions within the environmental area 101 should be adjusted in response to changes in the biometric conditions.

If conditions are to be modified, the computing device 104 may direct any number of secondary devices to change various conditions to make the environment more conducive to the physical activity. For instance, the computing device 104 may send instructions via an olfactory device driver 174 to a fragrance unit 608, which in turns directs olfactory device 162 to release fragrance in the air. The fragrance may be configured to simulate the smell of a dance hall, or a particular perfume that is pleasing to the user. In other situations, instructions may be sent to a temperature unit 506 to lower the ambient temperature of the area 101 as the user's own body temperature elevates. The computing device may further direct an airflow unit 610 and/or an air generation unit 508 to adjust the airflow device 154 and/or the pneumatic device 158. These adjustments, for example, may increase air movement as well as slightly increase oxygen into the room.

As the user ceases exercise, the biometric conditions change again, and the computing device 104 begins directing the various secondary devices to return to a pre-activity level.

Figure 7:
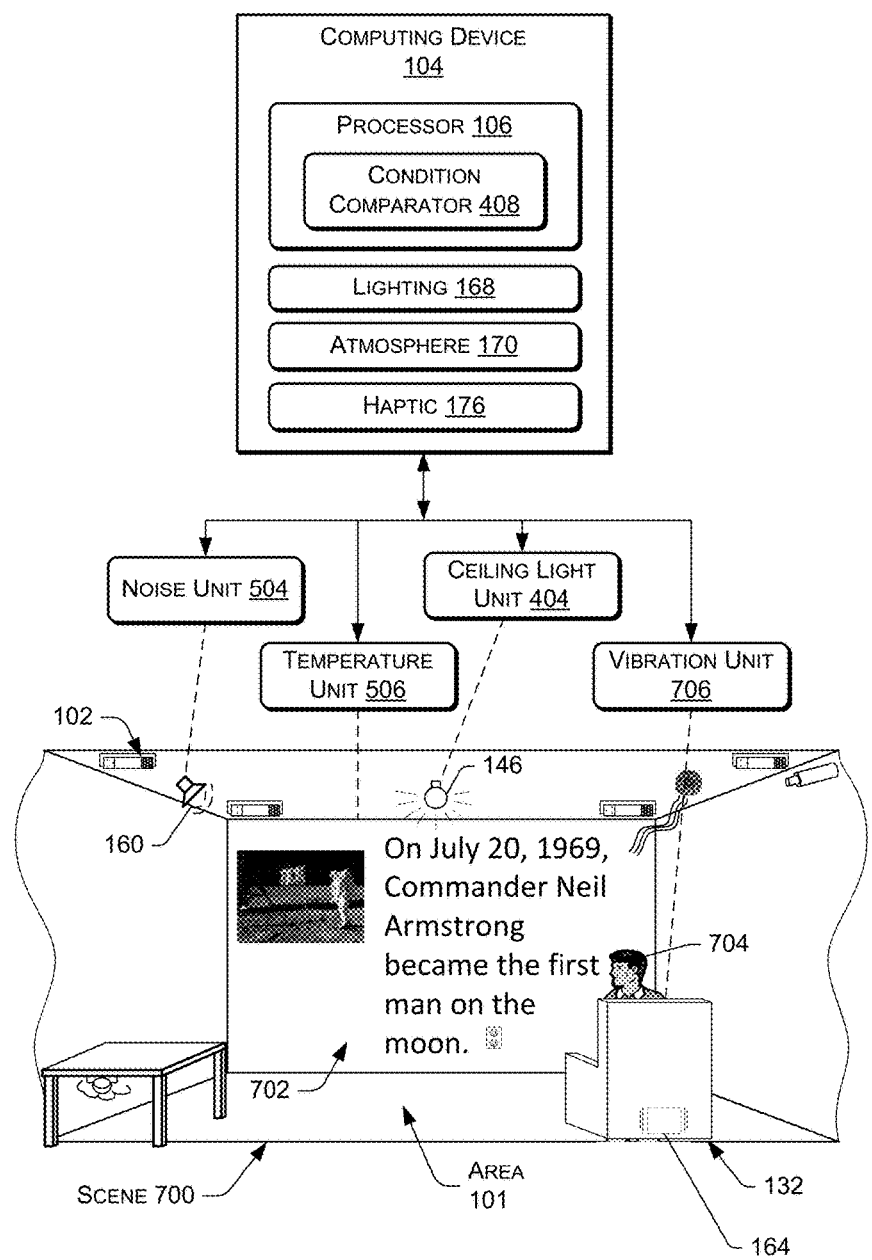
FIG. 7 shows an illustrative scene with an augmented reality environment in which the ARFN monitors whether the user is about to sleep. Depending upon the user's desire, the ARFN directs the secondary devices to modify conditions within the environmental area to make them more or less conducive to sleep.

FIG. 7 shows another illustrative scene 700 with an augmented reality environment in which the ARFN 102 monitors the user's state of restfulness and directs adjustment of the ambient conditions accordingly. For instance, suppose the scene 700 involves an educational tutorial on history. The projector of the ARFN 102 projects history facts and trivia 702 onto a wall for the user 704 to learn and answer. The user 704 may use voice commands or gestures to advance through the facts and trivia questions, which may be captured by the microphones or camera of the ARFN 102. These gestures may be detected by the same ARFN 102 projecting the facts and trivia 702 onto the wall, or by another ARFN 102 in the environment. In some implementations the facts and trivia 702 may be presented on a display device such as a television or computer monitor in the environment.

The user 704 is illustrated as sitting in the chair 132 while engaging in the history assignment projected onto an opposing wall. The camera on the ARFN 102 monitors whether the user exhibits a characteristic of sleepiness or a trend towards sleepiness. For instance, the camera may capture the user yawning or stretching in a way that might suggest such a trend. Alternatively, the biometric sensors may detect a drop in the user's pulse rate, breathing rate, or other conditions indicative of a resting state. In other implementations, the user may simply speak a command to indicate a desire to rest or sleep.

Upon detecting a trend towards sleepiness, the computing device 104 directs one or more secondary devices to selectively adjust ambient conditions of the area 101 in a manner conducive to facilitate sleep. For instance, the lighting driver 168 may direct the ceiling light unit 404 to dim or turn off the ceiling light 146 or any other device within the environment. The atmosphere driver 170 may direct the temperature unit 506 to change the room temperature, while the noise unit 504 is directed to cancel any external noise in the room. Moreover, the haptic driver 176 may direct a vibration unit 706 to initiate a mild vibration delivered by the vibration mechanism 164 in the chair 132. Or, the ARFN 102 may direct an audio system within the environment to add audio to the environment, such as white noise, soothing sounds (e.g., ocean waves), soothing music, or the like. With these modified conditions, the user is likely to rest more comfortably.

Alternatively, suppose the user has previously directed the ARFN 102 to keep him awake during the history lesson. Or perhaps, the user 704 speaks a command expressing his desire to remain awake. In this case, when the ARFN 102 detects that the user is slipping into a rest state or receives a user command, the computing device 104 may instead change conditions within the area 101 to awaken the user 704. For instance, the computing device 104 may increase the volume of the history lesson, or turn up the ceiling light 146, or modify the room temperature. In another implementation, the vibration mechanism 164 may be controlled to vigorously shake the chair 132 in an effort to awaken the user 704.

Illustrative Architecture

Figure 8:
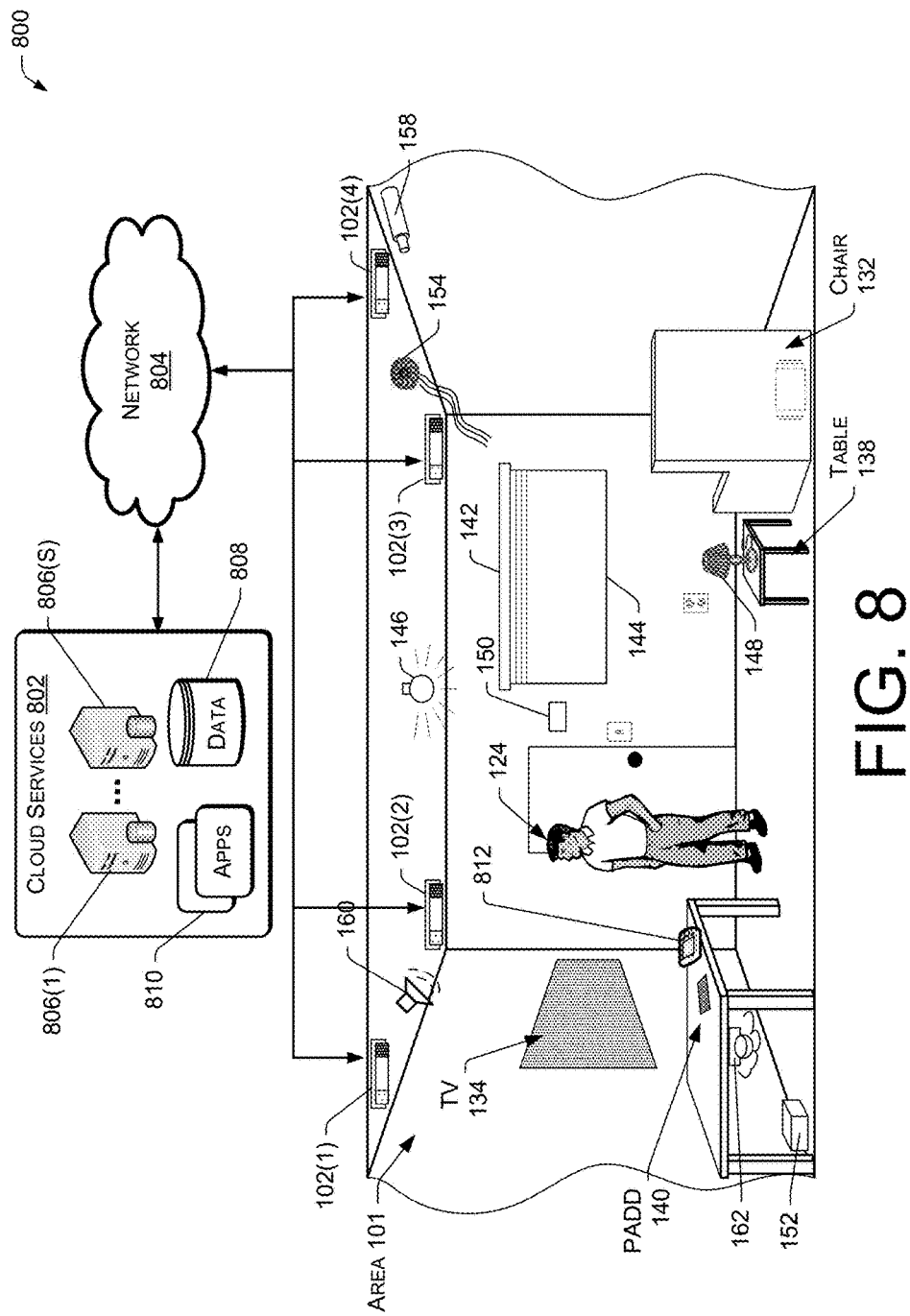
FIG. 8 shows an architecture having one or more ARFNs connectable to cloud services via a network.

FIG. 8 shows an architecture 800 in which the ARFNs 102(1)-(4) residing in the room are further connected to cloud services 802 via a network 804. In this arrangement, the ARFNs 102(1)-(4) may be integrated into a larger architecture involving the cloud services 802 to provide an even richer user experience. Cloud services generally refer to the computing infrastructure of processors, storage, software, data access, and so forth that is maintained and accessible via a network such as the Internet. Cloud services 802 do not require end-user knowledge of the physical location and configuration of the system that delivers the services. Common expressions associated with cloud services include "on-demand computing", "software as a service (SaaS)", "platform computing", and so forth.

As shown in FIG. 8, the cloud services 802 may include processing capabilities, as represented by servers 806(1)-(S), and storage capabilities, as represented by data storage 808. Applications 810 may be stored and executed on the servers 806(1)-(S) to provide services to requesting users over the network 804. Essentially any type of application may be executed on the cloud services 802. One possible application is a user identification and authentication application. This application receives user data from an augmented reality environment, and attempts to verify a specific user from that data. The user data may be an image of certain physical features, such as facial features captured by the ARFN 102. The user data may be a hand profile, or a fingerprint, or a voice file, or a retina scan, or other biometric data, or a pass code. The user data may be processed against a collection of authorized user profiles stored in the data storage 408 to determine whether this particular user should be authorized. In this manner, the cloud services 802 perform the user authentication task in addition, or as opposed, to the ARFN-resident module 122 shown in FIG. 1. Other examples of cloud services applications include sales applications, programming tools, office productivity applications, search tools, mapping and other reference applications, media distribution, social networking, and so on.

The network 804 is representative of any number of network configurations, including wired networks (e.g., cable, fiber optic, etc.) and wireless networks (e.g., cellular, RF, satellite, etc.). Parts of the network may further be supported by local wireless technologies, such as Bluetooth, ultra-wide band radio communication, wifi, and so forth.

By connecting the ARFNs 102(1)-(4) to the cloud services 802, the architecture 800 allows the ARFNs 102 associated with a particular environment, such as the illustrated room, to access essentially any number of services. Further, through the cloud services 802, the ARFNs 102 may leverage other devices that are not typically part of the system to provide secondary sensory feedback. For instance, user 124 may carry a personal cellular phone or portable digital assistant (PDA) 812. Suppose that this device 812 is also equipped with wireless networking capabilities (wifi, cellular, etc.) and can be accessed from a remote location. The device 812 may be further equipped with an audio output components to emit sound, as well as a vibration mechanism to vibrate the device when placed into silent mode. A portable laptop (not shown) may also be equipped with similar audio output components or other mechanisms that provide some form of non-visual sensory communication to the user.

With architecture 800, these devices may be leveraged by the cloud services to provide forms of secondary sensory feedback. For instance, the user's PDA 812 may be contacted by the cloud services via a network (e.g., a cellular network, WiFi, Bluetooth, etc.) and directed to vibrate in a manner consistent with providing a warning or other notification to the user while the user is engaged in an augmented reality environment. As another example, the cloud services 802 may send a command to the computer or TV 134 to emit some sound or provide some other non-visual feedback in conjunction with the visual stimuli being generated by the ARFNs 102. While architecture 800 illustrates the PDA 812, it is to be appreciated that any other type of device may be utilized, as discussed above.

In addition, the secondary devices—window blind 142, ceiling light 146, lamp 148, temperature regulator 150, humidity regulator 152, and so on—may also be coupled to the cloud services 802. In this way, the ARFNs 102(1)-(4) may leverage the cloud services 802 to communicate with the secondary devices. That is, the ARFNs may send instructions for changing various conditions within the area 101 to the cloud services 802, which in turn convey those instructions (or translated versions of them) to the secondary devices that control the conditions within the area 101.

Figure 9:
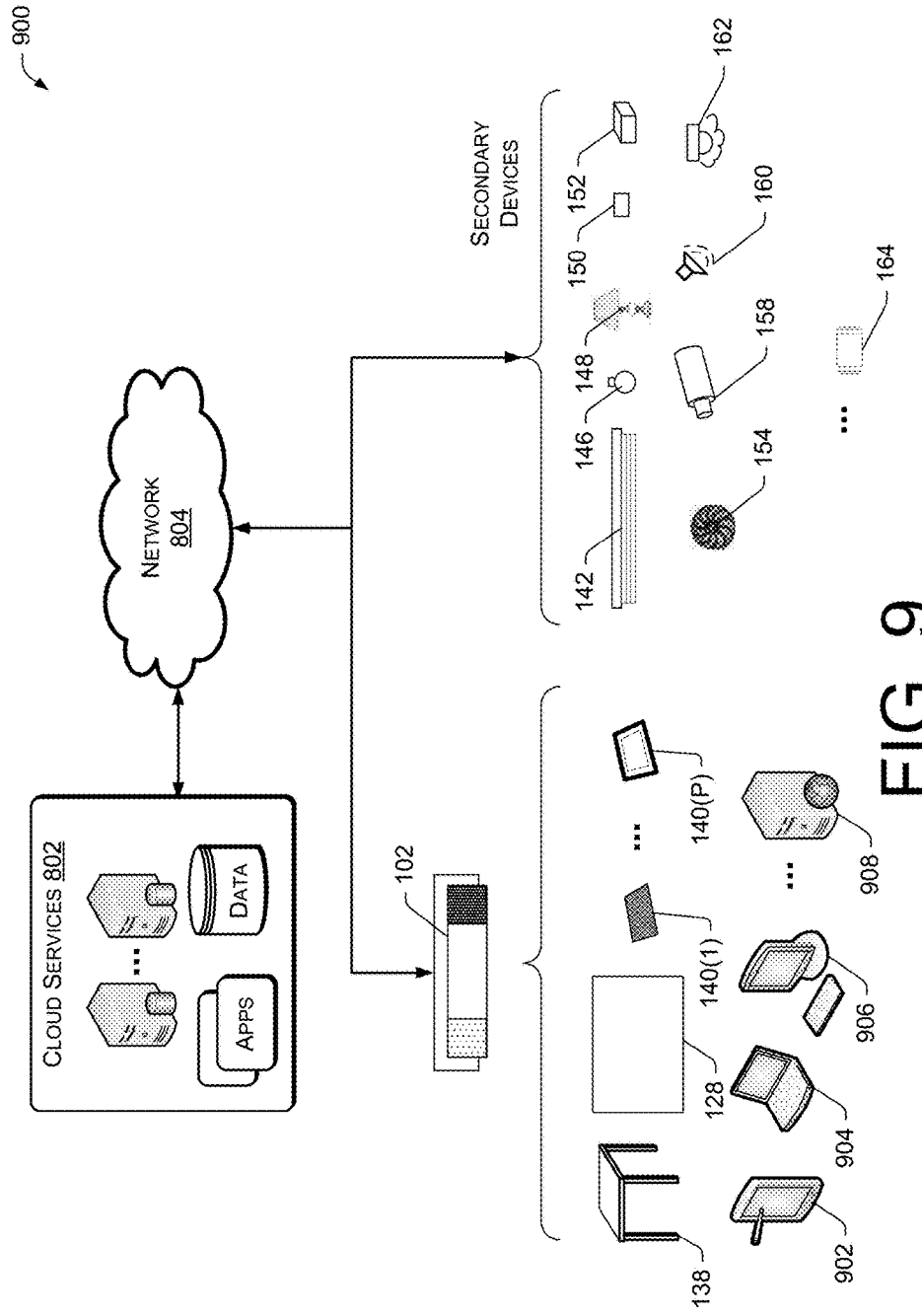
FIG. 9 illustrates an example collection of resources that may be employed in the architecture. These resources include items typically associated with an augmented reality environment, items that are typically not intended for use in such environments, and secondary devices that may be used to control conditions within the environmental area.

FIG. 9 illustrates an abstraction 900 of the architecture in which an augmented reality environment, the resources used to create the augmented reality environment, and the secondary devices may be leveraged as clients to interact with applications and data provided by the cloud services 802. In this illustration, the cloud services 802 are coupled via the network 804 to a system of ARFNs, as represented by ARFN 102, and/or to resources equipped with network access capabilities. ARE resources that may be employed by the ARFN 102 include essentially any surface onto which an image may be projected and/or any device that may depict an image. Examples include the surface of table 138, walls, and any number of implementations of the accessory display device 140(1)-(P). As noted above, the accessory display devices may range from a simple piece of material having a projection surface, to mechanical tablet with some mechanical functionality (e.g., audible sound generation), to a low functioning electronic devices (e.g., limited memory and processing, and remotely powered), to powered electronic devices (e.g., display, processor, memory, etc), to full functioning computing devices.

The architecture may also make use of any sort of resource in the augmented reality environments. Some of these resources (e.g. client computing devices within the environment) may themselves be leveraged by the architecture through their connection with the cloud services 802 via the network 804 or through any form of wired or wireless communication with the ARFN 102. Representative resources within the environment that may be utilized include a tablet 902, a portable computer 904, a desktop computer 906, and a server 908 (e.g., a media server). These devices may be used to provide primary visual stimuli, such as depicting images on the screens.

The architecture may further count secondary devices as clients of the cloud services 802. Such secondary devices may be controlled by the ARFN 102, the cloud services 802, or a combination of the thereof. Representative secondary devices include the window blind 142, ceiling light 146, lamp 148, temperature regulator 150, humidity regulator 152, an air flow device 154, pneumatic device 158, a noise cancelation system 160, olfactory device 162 and a vibration mechanism 164.

Illustrative Processes

Figure 10:
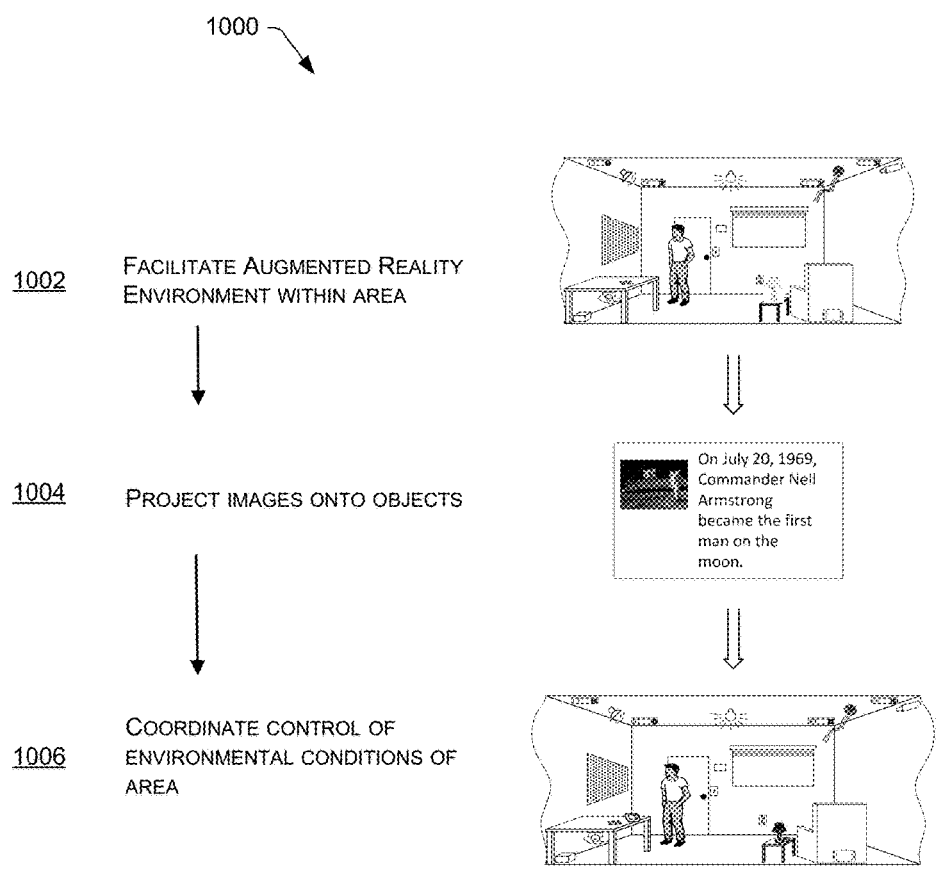
FIG. 10 is a flow diagram showing an illustrative process of providing an enhanced augmented reality environment with control of conditions external to the augmented reality environment.

FIG. 10 shows an illustrative process 1000 of providing an enhanced augmented reality environment with control of conditions external to the augmented reality environment. The processes described herein, including the processes of FIGS. 10, 11, and 12, may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1002, an augmented reality environment is facilitated within a scene, such as within a room. The augmented reality environment is generated through a combined use of projection, camera, and display resources in which projectors project images onto surroundings that define the environment and cameras monitor user interactions with such images. In one implementation described herein, the augmented reality environment is created by one or more ARFNs 102.

At 1004, images are projected onto one or more objects throughout the room, such as table surfaces, walls, and other objects. In the illustrated example, history facts and trivia is shown projected onto a wall, or other type of surface. These images form the primary visual stimuli of the augmented reality environment. These images may also be depicted by leveraging imaging devices (e.g., TVs, computer monitors, etc.) available within the room. The user may interact with the images via hand or body movement, voice commands, and so forth.

At 1006, conditions found in the environmental area are controlled in cooperation with the augmented reality environment. These conditions are external to generation of the augmented reality environment. The conditions may be controlled by secondary devices which are also not part of the system for generating the augmented reality environment. However, in one implementation, the system used to facilitate the augmented reality environment (e.g., ARFN 102) is configured to sense the ambient conditions and direct various secondary devices to make suitable changes in coordination with the augmented reality environment.

Figure 11:
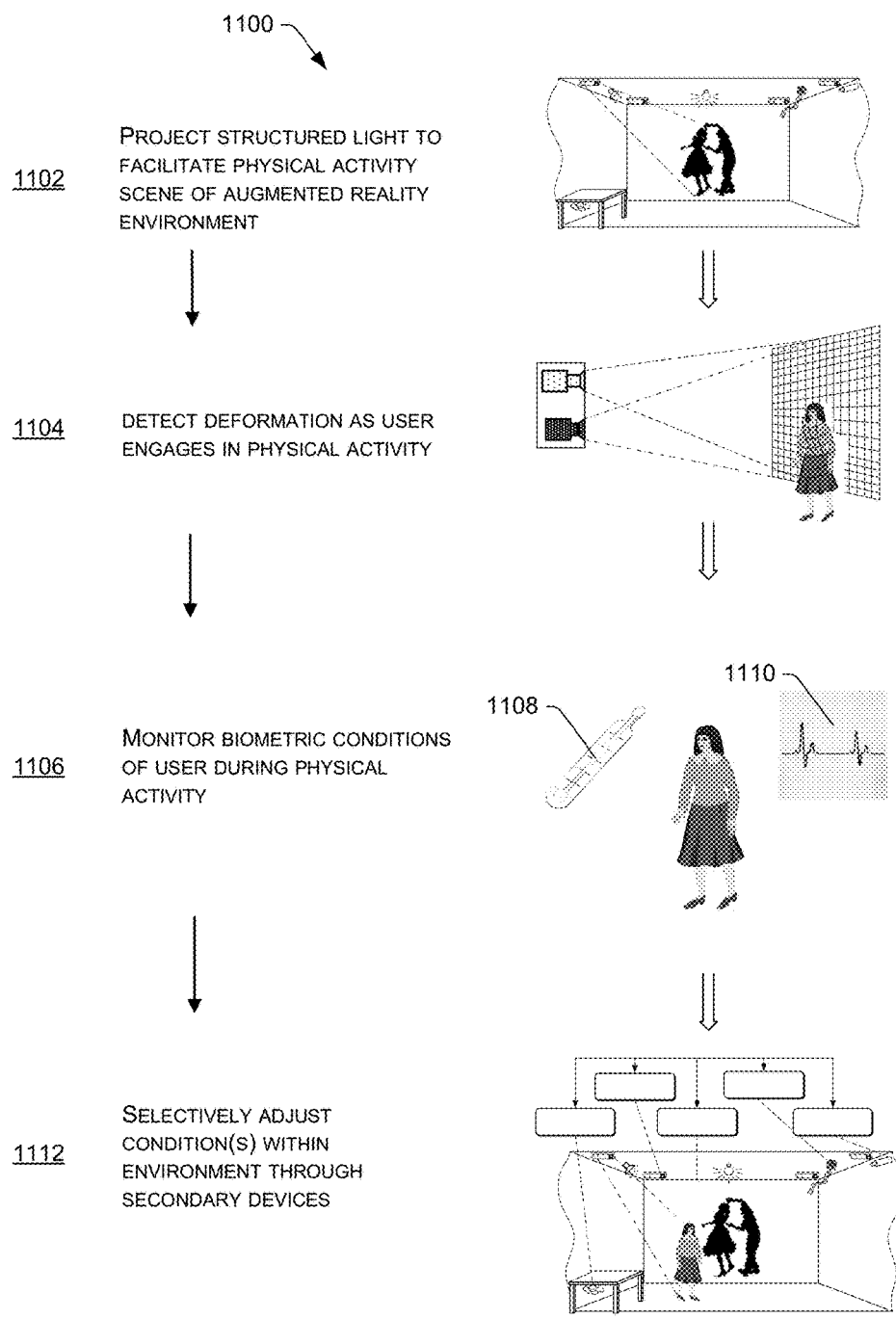
FIG. 11 is flow diagram showing an illustrative process of facilitating an augmented reality environment involving physical activity.

FIG. 11 shows an illustrative process 1100 of facilitating an augmented reality environment involving physical activity. This is an example of a particular use case to demonstrate how the ARFNs and secondary devices can cooperate to provide an enhanced user experience. In this example, the user is engaging in physical activity, such as country dancing, and ambient conditions are monitored and modified throughout that activity.

At 1102, an ARFN projects structured light onto the scene. Of course, while FIG. 11 illustrates the use of structured light, other implementations may utilize any other type of depth-sensing technique, such as the techniques described above. In addition, another ARFN may project an image to facilitate an augmented reality environment. In this example, the scene involves physical activity of the user, such as country dancing as exhibited in the illustration.

At 1104, user movement is monitored within the environment as deformation of the projected structured light is detected when the user engages in the physical activity to navigate through the scene. In this example, as the user dances around the room, the camera of the ARFN captures this movement as input or participation in the augmented reality environment.

At 1106, biometric conditions of the user are monitored as the user engages in the physical activity. Any number of biometric conditions may be tracked, such as the user's temperature 1108 and heart rate 1110 (or other cardiac metrics, like pulse rate). These biometric conditions may be monitored directly by the ARFN 102 or indirectly by biometric devices and transmitted to the ARFN for analysis relative to the augmented reality environment.

At 1112, one or more conditions of an ambient environment encompassing the scene may be selectively adjusted in response to changes in the biometric conditions of the user. The computing device 104 determines, based on the user's current biometric measures and present stage of the augmented reality environment, whether to make adjustments to the ambient environmental conditions. If changes are to be made, the computing device 104 directs one or more of the secondary devices to make the modifications.

Figure 12:
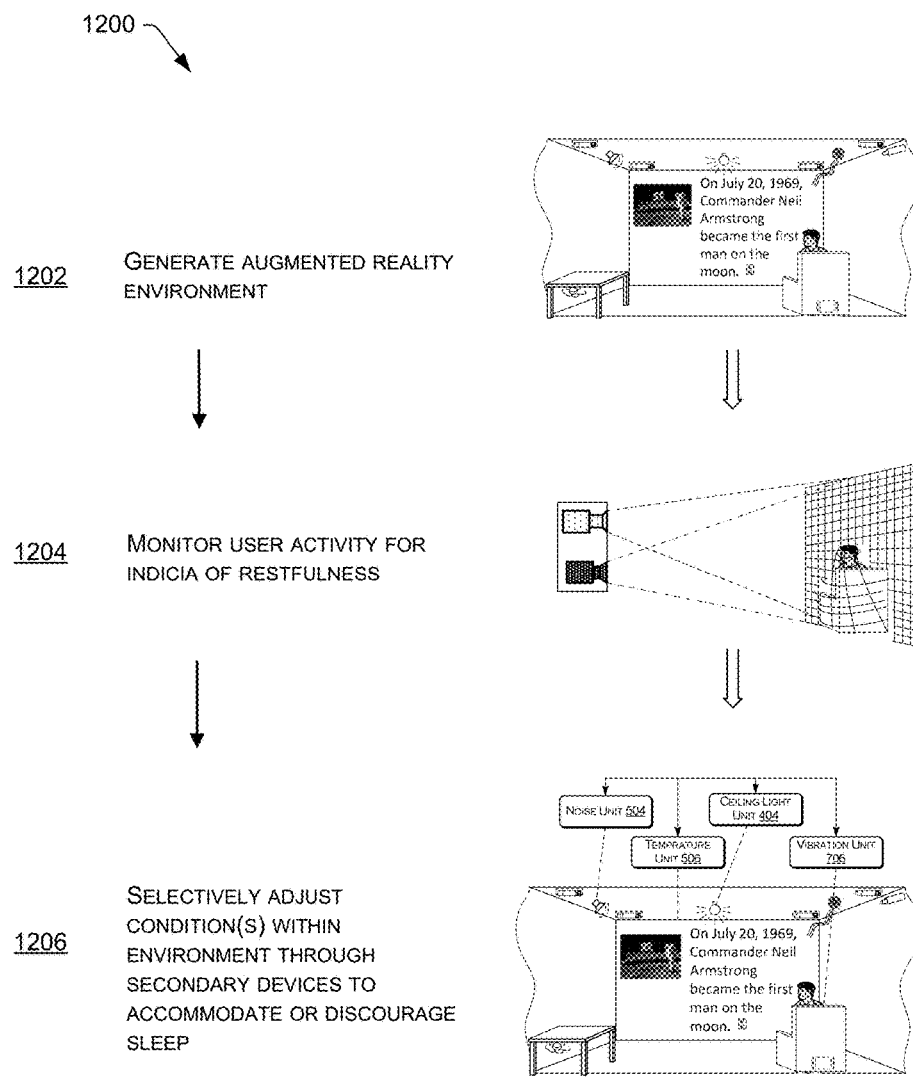
FIG. 12 is flow diagram showing an illustrative process of enhancing user experience while interacting with an augmented reality environment by either promoting or discouraging sleep.

FIG. 12 is shows an illustrative process 1200 of enhancing user experience while interacting with an augmented reality environment by either promoting or discouraging sleep.

At 1202, an augmented reality environment is generated by, for instance, an ARFN projecting content onto a wall of the room. In this example, the user is seated in a chair and interacting with a history lesson that includes projection of facts and trivia onto the wall and detection of user movement or voice commands for answers or instructions.

At 1204, user activity (or inactivity) is monitored to ascertain whether the user exhibits a trend towards sleepiness while in the augmented reality environment. For instance, the ARFN 102 or another ARFN may watch for lack of any movement from the user within the structured light patterns for a prolonged period of time, or for a movement indicative of sleepiness, such as a yawn or stretching motion. Alternatively, the ARFN may detect a voice command expressing an intention of the user to "Sleep" or remain "Awake".

At 1206, upon detecting the user's intention, selectively adjusting one or more conditions of an ambient area encompassing the augmented reality environment in a manner conducive to sleep, or alternatively, to discourage sleep. More particularly, if the ARFN determines that the user is drifting into a state of restfulness, the ARFN may direct one or more secondary devices to adjust conditions within the room. For instance, the ARFN may request a change in temperature, a slight vibration in the chair, a reduction in volume, and reduction in lighting. On the other hand, if the ARFN determines that the user does not wish to sleep, the ARFN may direct one or more secondary devices to adjust conditions within the room to discourage sleeping. For instance, the ARFN may request a change in temperature, a vigorous vibration in the chair, an increase in volume, and increase in lighting, and perhaps an increase in air movement.

There are merely examples. Many other implementations may be achieved through an architecture of ARFNs and secondary devices.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An electronic device comprising:
  a speaker;
  a microphone;

a communication interface configured to exchange information with a remote computing device that is configured to communicate with a secondary device that controls an environmental condition within a predefined environment;

one or more sensors to detect the environmental condition within the predefined environment;

one or more processors; and memory to store computer-executable instructions that, when executed, cause the one or more processors to:

receive, via the microphone, a user request to set a parameter of the environmental condition at a first value;

determine, based at least partly on first data from the one or more sensors, a second value of the parameter of the environmental condition;

determine that the second value of the parameter differs from the first value of the parameter by more than a threshold amount;

output, via the speaker, a notification of a proposed change to the parameter, the proposed change to physically alter the predefined environment;

generate, based at least in part on a voice input received via the microphone, second data indicative of a user response to the notification;

send the second data indicative of the user response to the remote computing device to cause the remote computing device to send a signal to the secondary device to initiate the proposed change;

determine, based at least in part on third data from the one or more sensors, a third value of the parameter of the environmental condition; and determine that the third value of the parameter does not differ from the first value by more than the threshold amount.

2. The electronic device as recited in claim 1, wherein the communication interface is further configured to provide wireless communication with the secondary device, and wherein the electronic device is located outside of the predefined environment and the secondary device is located within the predefined environment.

3. The electronic device as recited in claim 1, wherein the environmental condition comprises ambient temperature within the predefined environment, and wherein the secondary device comprises an ambient temperature regulator configured to alter the ambient temperature of the predefined environment in response to the signal from the remote computing device.

4. The electronic device as recited in claim 1, wherein the environmental condition comprises ambient light within the predefined environment, and wherein the secondary device is configured to alter the ambient light of the predefined environment in response to the signal from the remote computing device.

5. The electronic device as recited in claim 1, wherein the environmental condition comprises ambient humidity within the predefined environment, and wherein the secondary device comprises a humidity regulator configured to alter the ambient humidity of the predefined environment in response to the signal from the remote computing device.

6. The electronic device as recited in claim 1, wherein the environmental condition comprises air flow within the predefined environment, and wherein the secondary device comprises a fan configured to alter air movement within the predefined environment in response to the signal from the remote computing device.

7. The electronic device as recited in claim 1, wherein the environmental condition comprises a noise level in the predefined environment, and wherein the secondary device comprises a noise cancellation system configured to reduce an audible impact of sounds within the predefined environment in response to the signal from the remote computing device.

8. The electronic device as recited in claim 1, wherein:

the electronic device is configured to output a message associated with a user activity; and the secondary device is configured to cause the proposed change to the parameter of the environmental condition based at least in part on the output of the message.

9. A system comprising:

a first device including a speaker, a sensor, and a microphone, the first device to receive, via the microphone, a user request to set, to a first value, a parameter associated with an environmental condition of a predefined environment associated with the first device, wherein the first device is in communication with a remote computing device, the remote computing device in communication with a second device to controllably alter the parameter associated with the environmental condition; the first device to:

determine, based at least in part on first data obtained from the sensor, a current value the parameter;

determine that the current value of the parameter differs from the first value of the parameter by more than a threshold amount;

output, via the speaker, a notification of a proposed change to the parameter;

generate, based at least in part on a voice input received via the microphone, second data indicative of a user response to the notification; and provide instructions to the remote computing device to cause the remote computing device to instruct the second device to implement the proposed change.

10. The system as recited in claim 9, wherein the second device includes at least one of an ambient temperature regulator, a humidity regulator, or an air movement mechanism to implement the proposed change in accordance with the voice input.

11. The system as recited in claim 9, wherein the first device is located outside of the predefined environment and the second device is located within the predefined environment.

12. A method comprising:

identifying first voice input captured by a microphone of a first device to change a parameter associated with an environmental condition to a first value;

determining, based least in part on sensor data generated by the first device, a current value of the parameter;

determining, based at least in part on the first value and the current value differing by more than a threshold amount, a proposed change to the parameter;

outputting, via a speaker of the first device, a notification of the proposed change to the parameter;

determining, based at least in part on a second voice input captured by the microphone of the first device, a user response to the notification of the proposed change to the parameter; and sending, to a remote computing device and based at least partly on the user response, a signal to cause the remote computing device to instruct a second device implement the proposed change to the parameter.

13. The method as recited in claim 12, further comprising:
determining a location associated with the proposed change to the environmental condition.

14. The method as recited in claim 12, further comprising:
obtaining biometric data of an individual;
performing an analysis of the biometric data of the individual with respect to previous biometric data of the individual; and
wherein the proposed change to the parameter is based at least partly on the analysis of the biometric data of the individual.

15. The method as recited in claim 14, wherein the proposed change to the parameter corresponds to a change to an ambient temperature of the location, and the change to the ambient temperature is based at least partly on at least one of a body temperature of the individual or a heart rate of the individual.

16. The method as recited in claim 12, further comprising obtaining third voice input related to interactions with images projected into an environment associated with the first device.

17. The method as recited in claim 12, further comprising:
determining, based at least partly on biometric data of an individual, that the individual exhibits a characteristic of sleepiness; and
determining an additional change to the environmental condition based at least in part on at least one of the biometric data or third voice input.

* * * * *